(12) United States Patent
Sewall et al.

(10) Patent No.: US 8,830,075 B2
(45) Date of Patent: Sep. 9, 2014

(54) MULTIPURPOSE INDICATOR LIGHTS

(71) Applicant: Cradlepoint, Inc., Boise, ID (US)

(72) Inventors: Patrick Sewall, Boise, ID (US); David A. Johnson, Boise, ID (US)

(73) Assignee: Cradlepoint, Inc., Boise, ID (US)

( * ) Notice: Subject to any disclaimer, the term of this patent is extended or adjusted under 35 U.S.C. 154(b) by 0 days.

(21) Appl. No.: 13/863,187

(22) Filed: Apr. 15, 2013

(65) Prior Publication Data

US 2013/0229279 A1 Sep. 5, 2013

Related U.S. Application Data

(63) Continuation of application No. 12/172,873, filed on Jul. 14, 2008, now Pat. No. 8,421,637.

(60) Provisional application No. 60/949,585, filed on Jul. 13, 2007.

(51) Int. Cl.
*G08B 21/00* (2006.01)
*G08B 5/36* (2006.01)
*H04L 12/773* (2013.01)
*H04L 12/26* (2006.01)
*H04W 40/00* (2009.01)
*H04W 88/02* (2009.01)
*H04W 24/00* (2009.01)

(52) U.S. Cl.
CPC .............. *G08B 5/36* (2013.01); *H04W 88/02* (2013.01); *H04L 45/60* (2013.01); *H04L 43/0817* (2013.01); *H04W 24/00* (2013.01); *H04W 40/00* (2013.01)
USPC ....................................... 340/636.1; 340/635

(58) Field of Classification Search
USPC ................................. 340/636.1, 635; 370/252
IPC ................... G06F 1/00; H04B 1/00; H04L 1/00
See application file for complete search history.

(56) References Cited

U.S. PATENT DOCUMENTS

| 5,656,919 A | 8/1997 | Proctor et al. |
| 5,809,449 A * | 9/1998 | Harper ............................ 702/63 |
| 6,407,663 B1 * | 6/2002 | Huggett ......................... 340/461 |
| 2005/0068337 A1 * | 3/2005 | Duarte et al. ................. 345/649 |
| 2008/0056222 A1 * | 3/2008 | Waites .......................... 370/342 |

FOREIGN PATENT DOCUMENTS

| EP | 1329787 | 7/2003 |
| EP | 1475712 | 11/2004 |
| EP | 1494119 | 1/2005 |
| KR | 20000047713 | 7/2000 |

OTHER PUBLICATIONS

International Search Report and Written Opinion dated Apr. 14, 2008 issued in PCT Application No. PCT/US2008/076836.

* cited by examiner

*Primary Examiner* — Shirley Lu
(74) *Attorney, Agent, or Firm* — Parsons Behle & Latimer

(57) ABSTRACT

A method of utilizing device indicator lights is disclosed herein. The method includes providing a device that includes a plurality of device indicator lights and a user control, and monitoring a first set and a second set of device states. The first set of device states correspond to binary device states, and the second set of device states correspond to analog device states. The method also includes utilizing each of the plurality of device indicator lights individually to communicate one of first set of device states, determining whether the user control has been activated, and utilizing at least two of the plurality of device indicator lights in concert to communicate one of the second set of device states upon a determination that the user control has been activated.

20 Claims, 7 Drawing Sheets

MULTIPURPOSE INDICATOR LIGHTS

CROSS-REFERENCE TO RELATED APPLICATIONS

This application claims the priority of U.S. Non-Provisional patent application Ser. No. 12/172,873, entitled MULTIPURPOSE INDICATOR LIGHTS, filed Jul. 14, 2008, and U.S. Provisional Application No. 60/949,585 entitled ALTERNATIVE USE OF ROUTER INDICATOR LIGHTS, filed Jul. 13, 2007, which are hereby incorporated by reference.

BACKGROUND

Computers and other devices are linked in a local data network by a router. That router also enables those devices to communicate over a wide area data network such as the internet. The electronics that perform the router functions typically reside on one or more printed circuit boards housed in a protective enclosure. The enclosure provides various connectors for data flowing into and out of the router as well as a connector to provide power to the router. A router may have a user interface made up of lights and user controls such as buttons and switches. The controls allow a user to perform functions such as turning the router on and off or perform some aspect of configuring the router's behavior.

The user interface lights are often arranged in a row along an edge or the side of the router. By arranging the lights in this fashion, it is easy to label the function of each light and the lights are arranged to be all visible to the user at the same time. In addition, this is generally the simplest and most cost effective way to implements the lights, since the lights are often LED's (Light Emitting Diodes) which can be mounted in a row along the edge of a printed circuit board, so as to align with windows in the router's enclosure.

The user interface lights communicate the router's current state to the user. Each light has an individualized purpose. In other words, each light is reflective of one of any number of possible router functions or conditions. Possible states reflected by a given light include:

Power—an indication of whether the router is on or off;
WAN (Wide Area Network)—an indication of whether the upstream network is functioning correctly;
LAN (Local Area Network)—an indication of whether a particular physical LAN port is active.
USB (Universal Serial Bus)—an indication of whether the router has an active connection to a device through a USB port.
WiFi—an indication of whether the router is actively supporting a wireless network.
Modem—an indication of whether the router has a functioning connection with a modem such as a cable or DSL modem.

As noted, each indicator light is dedicated to indicating the status of a single function. To indicate the current status of a given function, a light may turn on or off, change color, blink, or do some combination thereof. For example, one light may be dedicated to indicating whether the router is on (light is on) or off (light is off), or is in the process of turning on (light is flashing).

Because a router's status indicator lights each serve an individual purpose, the type of information that can be communicated is limited. While some indicator lights may have multiple selectable colors and some may blink enabling each such light to indicate multiple states, the resolution provided by blinking and color selection is not sufficient to effectively communicate information such as a magnitude that is more analog in nature.

SUMMARY

A method of utilizing device indicator lights is disclosed herein. The method includes providing a device that includes a plurality of device indicator lights and a user control, and monitoring a first set and a second set of device states. The first set of device states correspond to binary device states, and the second set of device states correspond to analog device states. The method also includes utilizing each of the plurality of device indicator lights individually to communicate one of first set of device states, determining whether the user control has been activated, and utilizing at least two of the plurality of device indicator lights in concert to communicate one of the second set of device states upon a determination that the user control has been activated.

A system comprising a plurality of device indicator lights, a user control, a state engine, a light engine, and a control engine is also disclosed herein. The state engine is configured to monitor a first set and a second set of device states. The first set of device states correspond to binary device states, and the second set of device states correspond to analog device states. The light engine is configured to utilize each of the plurality of device indicator lights individually to communicate one of the first set of device states. The control engine is configured to determine whether the user control has been activated. And the light engine is further configured to utilize at least two of the plurality of device indicator lights in concert to communicate one of the second set of device states upon a determination by the control engine that the user control has been activated.

A computer readable medium having computer executable instructions is also disclosed herein. The instructions are executable by a device having a plurality of device indicator lights and a user control. The medium includes instructions for monitoring a first set and a second set of device states, wherein the first set of device states correspond to binary device states, and the second set of device states correspond to analog device states. The medium includes instructions for utilizing each of the plurality of device indicator lights individually to communicate one of the first set of device states. And the medium also includes instructions for determining whether the user control has been activated, and utilizing at least two of the plurality of device indicator lights in concert to communicate one of the second set of device states upon a determination that the user control has been activated.

DETAILED DESCRIPTION

Introduction: Various embodiments described below utilize a group of device indicator lights individually for a separate purposes while also selectively utilizing the group of indicator lights in concert to serve a common purpose. In other words, each device indicator light is able to operate individually to communicate a particular device state. However, when so selected, the group of indicator lights can be used together as a group to communicate yet another device state having a magnitude. In other words, the device indicator lights can be used in concert to communicate information such as a signal strength or a battery level.

For example, a device such as a cellular router provides the same functions as a standard wired router, and therefore includes indicator lights to communicate the same information in the same manner as a standard wired router. However, the cellular router has at least one additional piece of information to communicate to the user, which wired routers do not. Cellular routers connect to the internet through a wireless radio-to-radio connection supplied by a cellular telephone or some other device capable of exchanging data over a cellular network. As such, the state of the connection is not simply on or off, but includes the quality or strength of the connection.

Generally, a user is free to place the cellular router in many possible locations in the general areas where a local network is desired. However, it often proves desirable to place the cellular router in a location which maximizes the signal strength, and thereby provides the maximum possible data transmission rate between the cellular router and the cellular tower. If the signal strength between the cellular router and the cellular tower is weak, then the data transmission rates between the cellular router and the cellular tower will be slow. If the signal strength between the cellular router and the cellular tower is strong, then the data transmission rates can be fast. Various embodiments allow the router indicator lights to be used in concert to provide real-time feedback on the signal strength while the user is in the process of selecting a location to place the cellular router.

Figure 1:
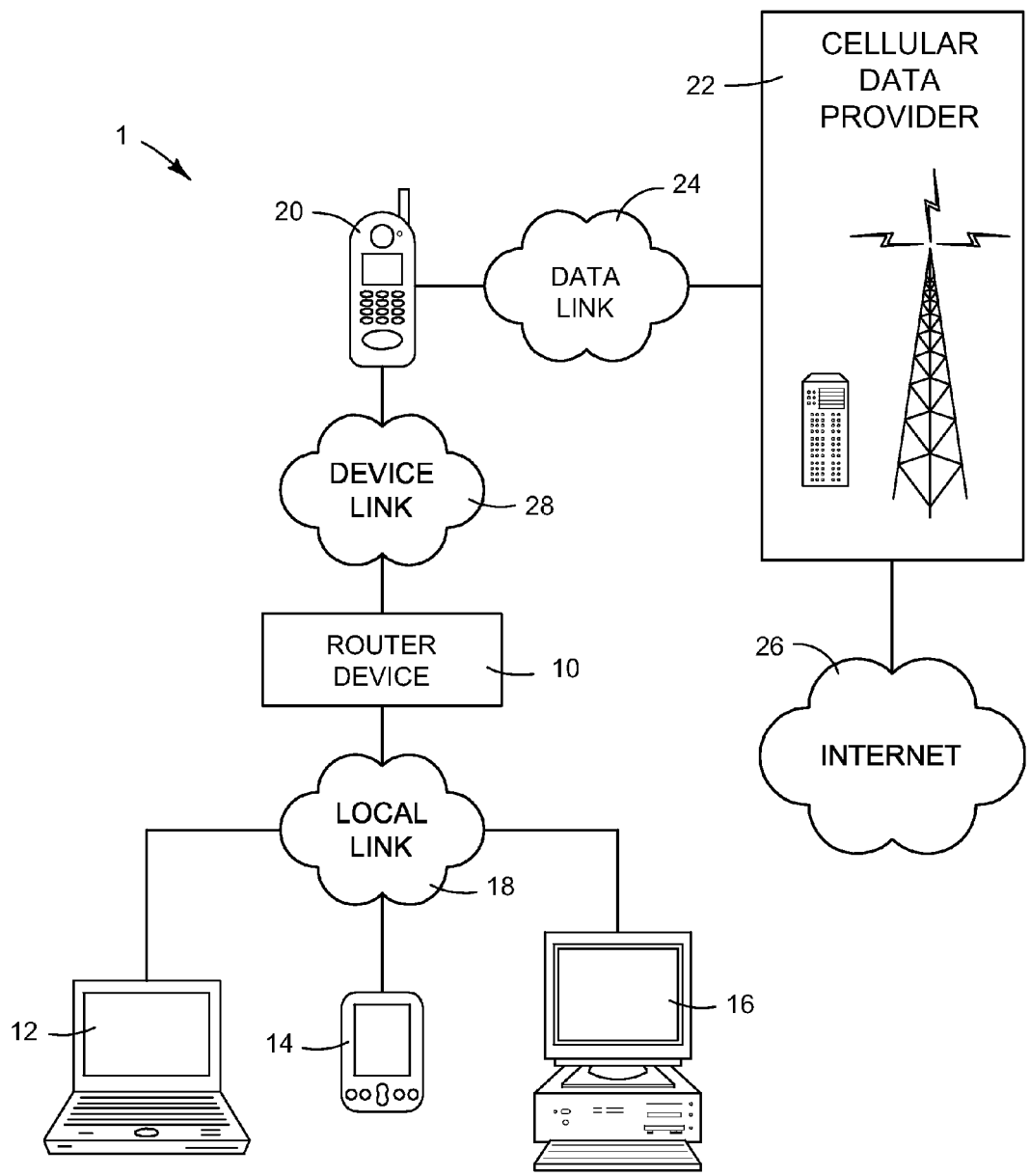
FIGS. 1 and 2 illustrate an exemplary block diagrams of environments in which embodiments of the present invention may be implemented.

Environment: FIG. 1 illustrates exemplary environment 1 in which various embodiments of the present invention may be implemented. Environment 10 includes router device 10 and clients 12, 14, and 16 and local link 18. Router device 10, discussed in more detail later, represents generally a device capable or routing network communications between clients 12, 14, and 16 and internet 26 via a data exchanger 20. Clients 12, 14, and 16 represent generally any computing devices capable of communicating with router device 10.

Local link 18 interconnects router device 10 and clients 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchanger 20 and service provider 22. Data exchanger 20 represents generally any combination of hardware and/or programming that can be utilized by router device 10 to connect to a remote network such as the internet. While illustrated as an internet enabled cellular telephone, data exchanger 20 is not so limited. For example, data exchanger 20 may be a PCMCIA card or other device capable of cellular data communication. Internet enabled cellular telephones and other devices that are capable of data communications over a cellular network are referred to herein as data capable cellular devices. Other examples for data exchanger 20 include but are not limited to DSL modems and cable modems.

Service provider 22 represents generally any infrastructure configured to provide internet related data services to subscribers such as an owner of data exchanger 20. For example, where data exchanger 20 is a data capable cellular devices, service provider 22 may be a cellular telephone service provider capable of providing voice and data services to subscribers allowing access to internet 26. Where data exchanger 22 is a DSL or cable modem, service provider 22 may be a more traditional internet service provider (ISP) providing data access to internet 26.

Data link 24 serves as a common communications link through which communications are routed between internet 26 and clients 12, 14, and 16. Data link 24 interconnects data exchanger 20 and service provider 22 and represents generally any combination of a cable, wireless, or remote connection via a telecommunication link, an infrared link, a radio frequency link, or any other connector or system that provides electronic communication between data exchanger 20 and service provider 22.

In the embodiment illustrated in environment 1, device link 28 interconnects router device 10 and data exchanger 20. Device link 28 represents generally any combination of a cable, wireless, or remote connection via a telecommunication link, an infrared link, a radio frequency link, or any other connector or system that provides electronic communication between devices 10 and 20. As examples, device link 28 may incorporate a physical USB cable or radio waves carrying Bluetooth communications.

Communication between clients 12, 14, and 16 and internet 26 is dependent upon router device 10. Router device 10, as discussed below with respect to FIGS. 3-6, includes components capable of collecting individualized usage information from clients 12, 14, and 16 accessing the Internet via data link 24 using a data plan assigned to data exchanger 20. Router device 10 is also capable of communicating the usage information to an interested server in the internet 26.

Figure 2:
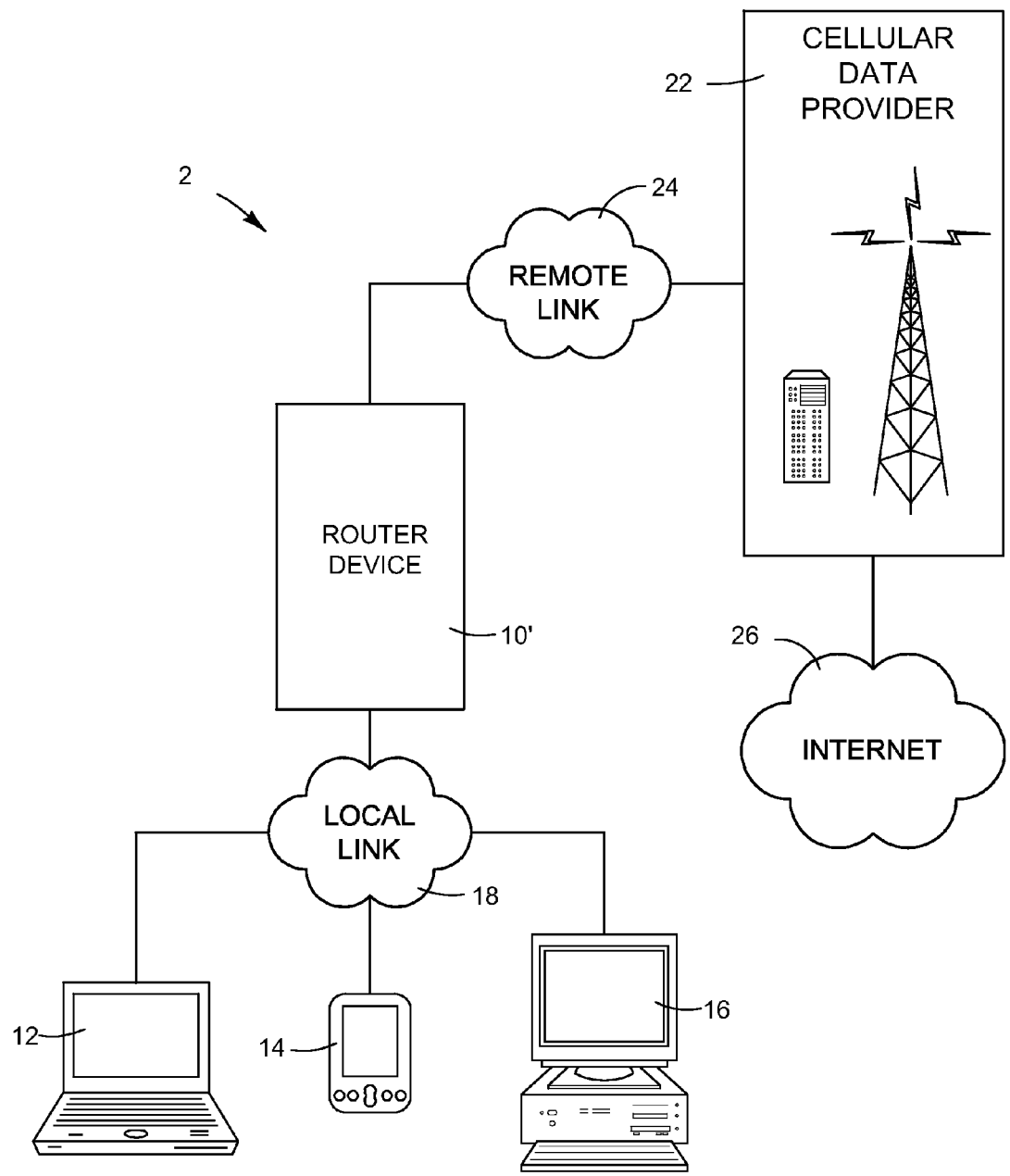

FIG. 2 illustrates another exemplary environment 2 in which various embodiments of the present invention may be implemented. In the example of FIG. 2, data exchanger 20 (not shown) and router device 10 are incorporated within the same device. Device link 32 (shown in FIG. 1) is eliminated and replaced with internal connections. In such a scenario, data exchanger may take the form of a PCMCIA card or any other device that can be inserter into a slot or otherwise coupled to router device 10. Alternatively, data exchanger 20 may be fully integrated into router device 10

Figure 3:
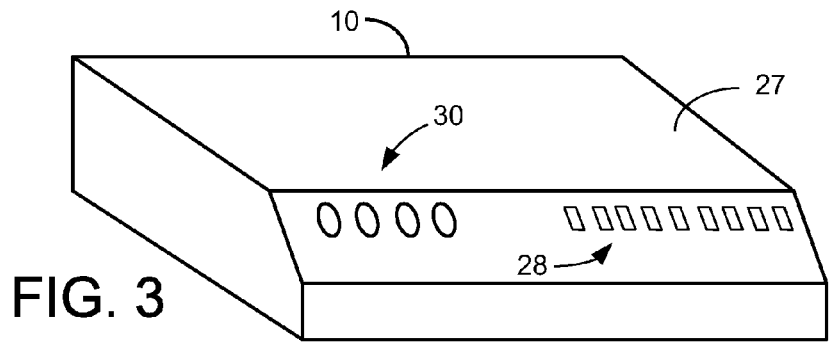
FIGS. 3-5 and 6A-6E are block diagrams showing physical and logical components of a router device according to an embodiment of the present invention.

Router Device: FIG. 3 is a sample illustration of the exterior of router device 10. In this example, router device 10 includes an enclosure 27 that encases internal circuitry. Enclosure 27 provides a user interface that includes a row of device indicator lights 28 and a series of user controls 30. While shown as including a particular configuration and number, the user interface can have any number of indicator lights 30 and controls oriented in any of a number of possible configurations. While controls 30 are shown as buttons that can be activated when pressed by a user, controls 30 can be any component type that can have a detectable response when activated by a user.

Figure 4:
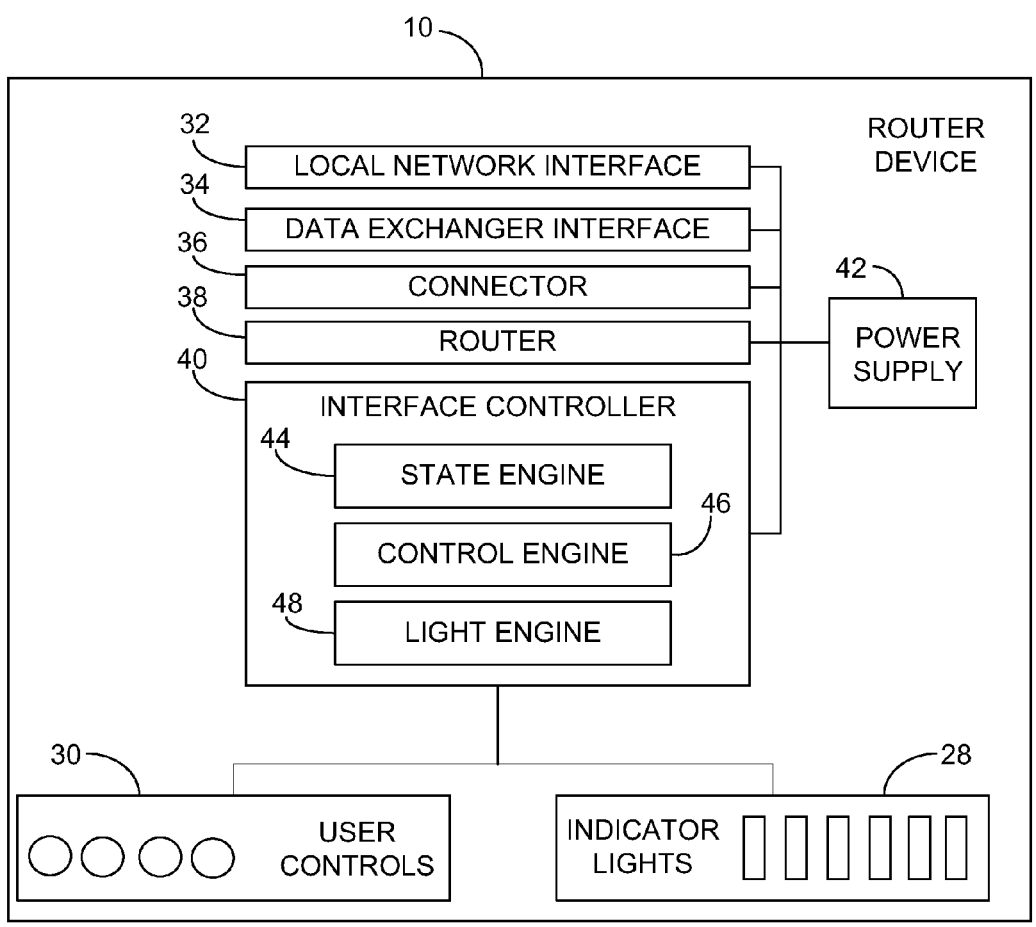

FIG. 4 is a block diagram illustrating physical and logical components of router device 10. As described above, router device 10 represents generally any combination of hardware and/ programming capable of directing network communications between clients and the internet via a data exchanger such as a data capable cellular device, DSL modem, or cable modem.

In the example of FIG. 4 router device 10 includes local network interface 32 and data exchanger interface 34. Local network interface 32 represents generally any combination of hardware and/or program instructions capable of supplying a communication interface between router device 10 and clients 12, 14, and 16 shown in FIGS. 1 and 2. Data exchanger interface 34 represents any combination of hardware and/or programming enabling data to be communicated between router device 10 and a data exchanger 20 shown in FIG. 1. For example, interfaces 32 and 34 may include a transceiver operable to exchange network communications utilizing a wireless protocol such as ultrawideband (UWB), Bluetooth, or 802.11. Alternatively, interfaces 32 and 34 may include physical ports or other physical connection points enabling wired communication. It is also noted that local network interface 32 may include both wired and wireless interfaces. The wireless interface, may for example, be a WiFi interface utilizing an 802.11 protocol or some other wireless protocol. The wired interface may, for example, a series of wired Ethernet ports.

Router device 10 also includes connector 36, router 38, interface controller 40 and power supply 42. Connector 36 represents generally any combination of hardware and/or programming for sending a signal to data exchanger 20 to establish a data connection with service provider 22 so that access can be made to internet 26. For example, where a data exchanger 20 is a data capable cellular device, connector 36 may send a signal causing the data capable cellular device to establish such a data link with service provider 22.

Router 38 represents generally any combination of hardware and/or programming for routing network communication received through network interface 32 to be transmitted by data exchanger 20 to internet 26. Router 38 is also responsible for routing inbound network communications received from internet 26 and directed via network interface 32 to a specified client 12, 14, or 16. Outbound and inbound network communications, for example can be an IP (internet Protocol) packets directed to a target on internet 26 or to a particular network device 12, 14, or 16 on a local area network.

Interface controller 40, described in more detail below, represents generally and combination of hardware and programming capable of monitoring various states of router device 10, detecting a user's activation of user controls 30, and utilizing indicator lights 28 to communicate various states of router device 10.

Power supply 42 represents generally any source of power capable of powering the various components of router device 10. While shown as being an integral component of router device 10, power supply 42 may instead be external. For example, power supply could be an integral component of data exchanger 20 (FIG. 1). In a given implementation, power supply 42 is a battery power supply.

Interface controller 40 is shown to include state engine 44, control engine 46, and light engine 48. State engine 44, represents generally any combination of hardware and programming capable of communicating with local network interface 32, data exchanger interface 34, connector 36, router 38, power supply 42, and data exchanger 20 (FIG. 1) to monitor various states of router device 10. As noted in the background section, those states can include:

Power—an indication of whether the router is on or off;
WAN (Wide Area Network)—an indication of whether the upstream network is functioning correctly;
LAN (Local Area Network)—an indication of whether a particular physical LAN port is active;
USB (Universal Serial Bus)—an indication of whether the router has an active connection to a device through a USB port.
WiFi—an indication of whether the router is actively supporting a wireless network; and
Modem—an indication of whether the router has a functioning connection with a data exchanger such as a data enabled cellular device, or a cable or DSL modem.

The status of each of the above states can be communicated in a binary nature. The power is either on or off, the WAN is either functioning or not, a particular LAN port is either active or not, and so on. Of course a different device implementing an embodiment would have different states.

The status of other device states are not capable of being effectively communicated in a binary manner. Such other states have a magnitude that is more analog in nature. For example, the other states can include a signal strength of data link 24 (FIG. 1), a battery power level for power supply, a number of client devices communicating with router device 10 via a wireless interface, and a rate at which data is being transferred over data link 24 (FIGS. 1 and 2). Each of these states has a magnitude that can be communicated on a scale ranging from minimum to maximum. A weak signal strength could be communicated as a minimum on the scale while a strong signal could be communicated as a maximum. Of course there are various levels of signal strength between minimum and maximum.

To monitor signal strength, state engine 44 may poll data exchanger 20 for the information via data exchanger interface 36. To monitor the number of client devices accessing router device 10 via a wireless interface, state engine 44 may poll local network interface 32. To monitor the rate at which data is being transferred on data link 24, state engine 44 may poll router 38 and/or data exchanger 20. To monitor the power level, state engine 44 may poll power supply 42.

Control engine 46 represents generally any combination of hardware and programming capable of determining if a given user control 30 has in fact been activated 30. For example, when a user depresses a control 30, a circuit is closed or opened which is detected by control engine 46. Control engine 46 identifies the particular user control 30 by identifying the particular circuit that has been closed or opened. Control engine 46 may also identify when two or more of controls 30 have been activated together. Control engine 44 may also responsible for communicating data to light engine 46 indicating which control button or buttons have been activated.

Light engine 48 represents generally any combination of hardware and programming capable utilizing indicator lights to communicate the status of various states monitored by state engine 44. In a default mode, light engine 48 utilizes each indicator lithe 28 individually to communicate a different state. When utilized individually, each indicator light 28 communicates information in corresponding to a different monitored state. As discussed above, one indicator light can be used to communicate whether or not router device is powered on. Another indicator light can communicate whether or not a particular LAN port is active. There are many such examples.

Light engine 48 is also responsible for utilizing indicator lights in concert to communicate the status of other states having a magnitude that can be represented on a scale. The activation of a single indicator light 28 would indicate that the given monitored state is at a minimum level or magnitude. Activation of all indicator lights 28 or a specified consecutive subset thereof, would indicate that the given monitored state is at a maximum magnitude. Thus, the number of consecutive lights being activated is proportional to the magnitude of the monitored state.

For example, a monitored state may be a level or magnitude that is seventy percent of maximum. In such a case, light engine 28 would activate a consecutive portion of indicator lights 28 dedicated to communicating that state. The number of consecutive indicator lights included in that portion as compared to the total number of indicator lights dedicated to communicating that state would be proportional to the seventy percent magnitude. In other words, if there are ten indicator lights dedicated to communicating the state, light engine 48 would activate a sequence of seven of those lights.

As a further explanation, each activated indicator light in the consecutive portion corresponds to a fraction of the magnitude of the monitored state. Since there are a finite number of indicator lights 28, the sum of those fractions plus a remainder will equal the monitored magnitude. As such light engine 48 activates the consecutive portion of indicator lights 28 in a first manner each light corresponding to a given fraction. This first manner may be turning on the consecutive portion of indicator lights 28 or causing the consecutive portion to light up in a particular color. Light engine 48 then activates another indicator light 28 in a second manner that is different than the first manner. The other indicator light 28 is not part of the consecutive portion but may be adjacent to the consecutive portion. For example, light engine 48 may cause the other indicator light 28 to blink. The rate at which the other indicator light 28 is caused to blink can reflect the size of the remainder. For example, as the magnitude of a monitored state increases in real time, the remainder also increased causing the rate at which that other indicator light blinks to also increase. A user viewing the acceleration in the blink rate could then, in real time, discern an increasing level magnitude for the particular state.

As the magnitude continues to increase, the blinking indicator light will eventually become one of the consecutive portion and another indicator light will be activated in the second manner. The same logic holds true when the magnitude of the monitored state is decreasing. In such a case the indicator light being activated in the second manned may have a decelerating blinking rate. Eventually, as the magnitude continues to decrease, that indicator light will no longer be active and one of the consecutive portion of indicator lights will be removed and activated in the second manner.

As noted above, light engine 48, by default, utilizes each indicator lithe 28 individually to communicate a different state. Light engine 48 is taken out of the default mode when control engine 46 determines that a given user control 30 has in fact been activated 30. When removed from default mode, light engine 48 utilizes indicator lights 28 in concert to communicate a given state. The particular state being communicated by utilizing the indicator lights in concert depends upon the particular user control 30 determined to have been activated. For example, the activation of one control 30 may cause a signal strength to be communicated while the activation of another control may cause a battery power level to be communicated. In yet another example, the activation of two controls 30 together may cause yet another state such as a transfer rate to be communicated.

As alluded to above, the indicator lights 28 may be divided into sets. Each set can then be used in concert to communicate a state. For example, upon determining that a first user control 30 has been activated, light engine 48 utilizes a first set of indicator lights 28 to communicate a first state corresponding to that first user control. Upon determining that a second user control 30 has been activated, light engine 48 utilizes a second set of indicator lights 28 to communicate a second state corresponding to that second user control. Thus each set of indicator lights 28 can be used in concert to communicate a different state.

Figure 5:
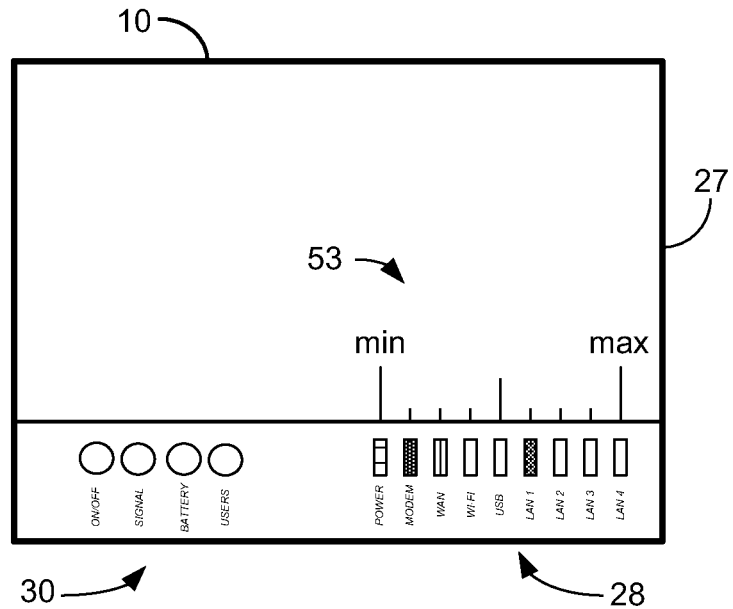
Figure 6A:
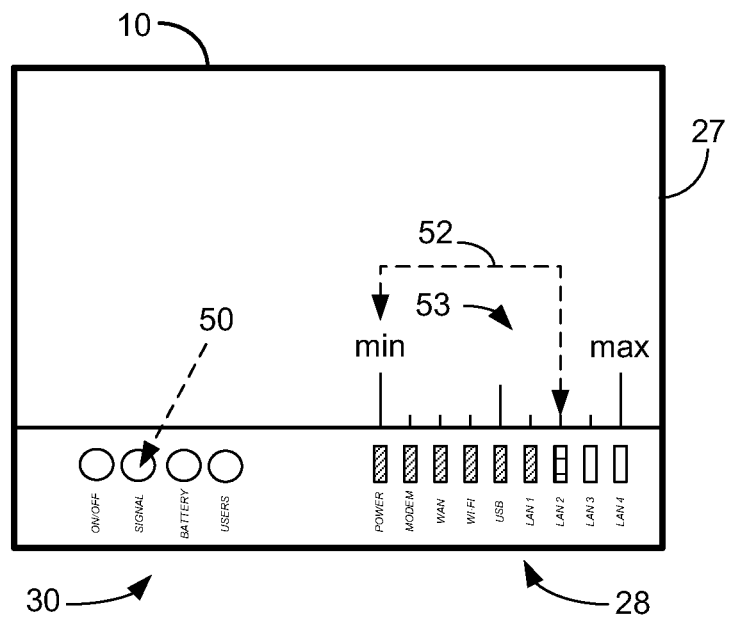

FIGS. 5 and 6A-6E illustrate examples of utilizing indicator lights 28 to communicate various states. In FIG. 5, indicator lights 28 are being utilized in a default mode so that each individually communicates different state. The particular state being communicated by a given indicator light 28 is identified by the label below that indicator light 28. In FIG. 6A, user control 30 labeled "SIGNAL" 50 has been activated taking indicator lights 28 out of default mode. In this example indicator lights 28 are being used in concert to communicate a signal strength 52. As shown, a consecutive portion of indicator lights are uniformly activated is a first manner while an adjacent indicator light positioned above the label "LAN2" has been activated in a second manner. As described above, the second manner of activation may result in blinking at a particular rate or the illumination of a particular color.

A scale 53 is imprinted on enclosure 27 of router device 10. The extent to which the consecutive portion of indicator lights are activated to fill scale 53 corresponds to the magnitude of the state being communicated. In this example, the scale ranges from a minimum corresponding to an indicator light 28 positioned above the label "POWER" to a maximum corresponding to an indicator light positioned above the label "LAN4"

Figure 6B:
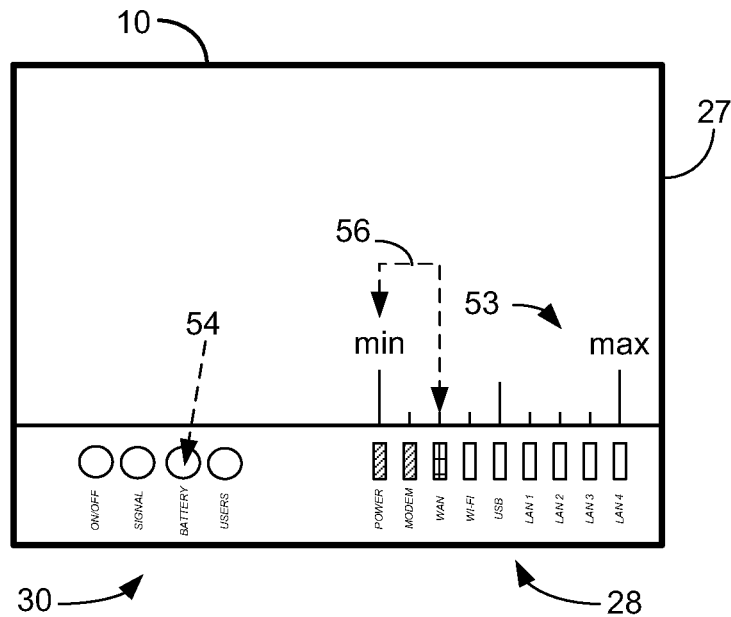

In FIG. 6B, user control 30 labeled "BATTERY" 54 has been activated taking indicator lights 28 out of default mode. In this example indicator lights 28 are being used in concert to communicate a battery strength or power level 56. As shown, a consecutive portion of indicator lights are uniformly activated is a first manner while an adjacent indicator light positioned above the label "WAN" has been activated in a second manner. As described above, the second manner of activation may result in blinking at a particular rate or the illumination of a particular color.

Figure 6C:
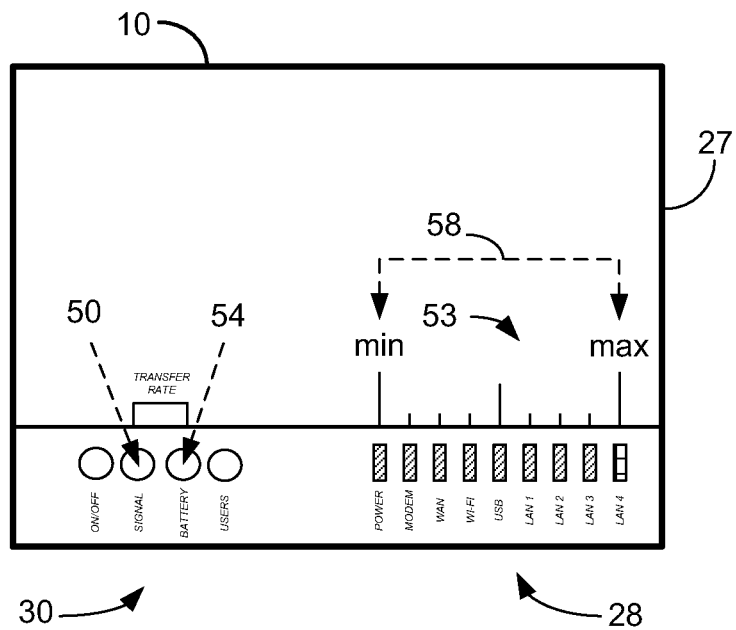

In FIG. 6C, two user controls 30 labeled "SIGNAL" 50 and "BATTERY" 54 have been activated together. In this example, the combination of user controls 50 and 54 are labeled "TRANSFER RATE." In this example indicator lights 28 are being used in concert to communicate a data transfer rate 58. As shown, a consecutive portion of indicator lights are uniformly activated is a first manner while an adjacent indicator light positioned above the label "LAN4" has been activated in a second manner. As described above, the second manner of activation may result in blinking at a particular rate or the illumination of a particular color.

Figure 6D:
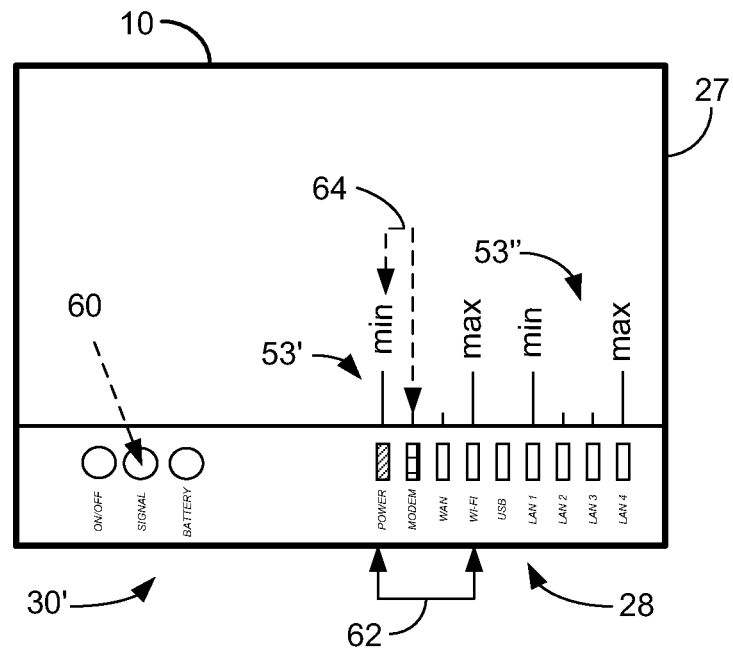
Figure 6E:
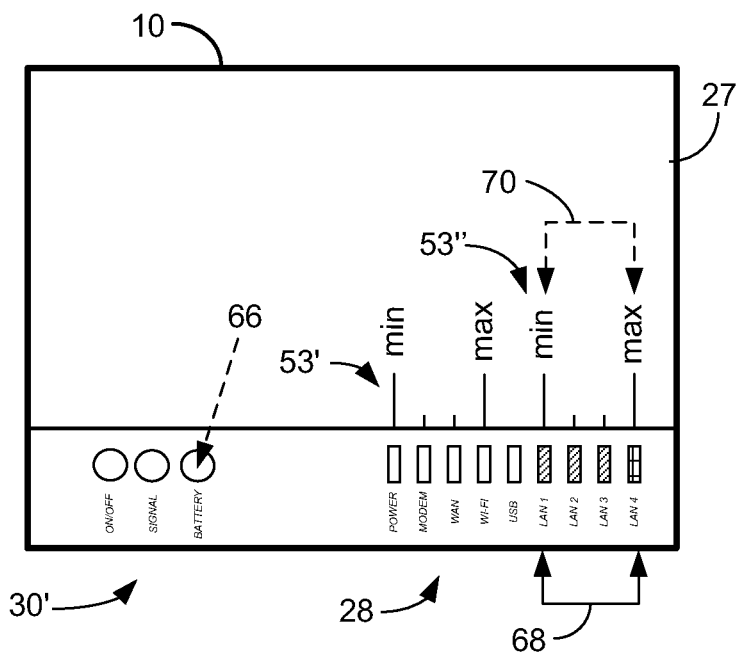

In FIGS. 6D and 6E, scale 53 has been replaced with scales 53' and 53". Scale 53' corresponds to a first consecutive set 62 of indicator lights 28 while scale 53" corresponds to a second set 68. Starting with FIG. 6D, user control 30' labeled "SIGNAL" 60 has been activated taking indicator lights 28 out of default mode. In this example indicator lights 28 of the first set 62 are being used in concert to communicate a signal strength 64. In FIG. 6E, user control 30' labeled "BATTERY" 66 has been activated taking indicator lights 28 out of default mode. In this example indicator lights 28 of the second set 68 are being used in concert to communicate a power level 70.

Figure 7:
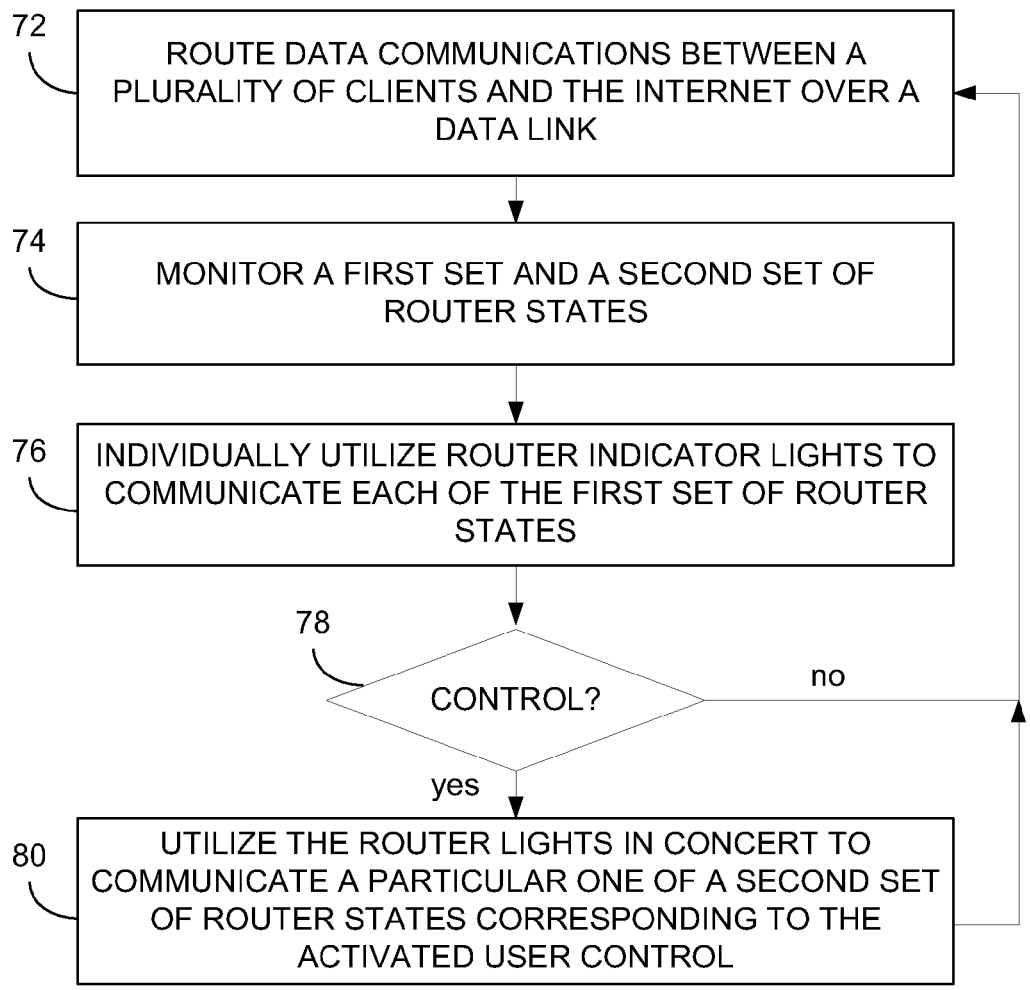
FIG. 7 is an exemplary flow diagram illustrating steps taken in performance of various embodiments of the present invention.

Operation: FIG. 7 is an exemplary flow diagram illustrating steps taken in performance of various embodiments. Data communications are routed between a plurality of clients and the internet over a data link (step 72). A first set and a second set of router states is monitored (step 74). The first set of router states include states that can each be communicated by utilizing an individual indicator light. The second set of router states includes states that are of a magnitude such that they are communicated by utilizing indicator lights in concert. The router indicator lights are individually utilized to communicate each of the first set of router states (step 76).

It is determined if a user control has been activated (step 78). If not, the process repeats with step 72. If a user control has been activated, the router indicator lights are utilized in concert to communicate one of the second router states corresponding to the particular user control that was determined to have been activated (step 80). The process then repeats with step 72.

Conclusion: The schematic diagrams of FIGS. 1 and 2 illustrate exemplary environments in which embodiments of the present invention may be implemented. Implementation, however, is not limited to these environments. Embodiments may be implemented in any device having indicator lights. The diagrams of FIGS. 3-6 show the architecture, functionality, and operation of various embodiments of the present invention. A number of the blocks are defined, at least in part, as programs or programming. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 7 shows specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method of utilizing device indicator lights, comprising:
    providing a device that includes a plurality of device indicator lights and a user control;
    monitoring a first set and a second set of device states, wherein the first set of device states correspond to binary device states, and the second set of device states correspond to analog device states;
    utilizing each of the plurality of device indicator lights individually to communicate a current binary status of each of the first set of device states;
    determining whether the user control has been activated;
    utilizing at least two of the plurality of device indicator lights in concert to communicate a current magnitude of one of the second set of device states upon a determination that the user control has been activated; and
    wherein at least one of the plurality of device indicator lights is used to communicate both the current binary status of one of the first set of device states and the current magnitude of one of the second set of device states.

2. The method of claim 1, wherein:
    providing a device comprises providing a router device configured to route data communications between a plurality of client devices and the internet via a shared wireless data link supplied by a data exchanger;
    monitoring a second set of device states comprises monitoring a strength of the wireless data link; and
    utilizing at least two of the plurality of device indicator lights in concert comprises utilizing at least two of the plurality of device indicator lights in concert to communicate the strength.

3. The method of claim 1, wherein:
    providing a device comprises providing a router device configured to route data communications between a plurality of client devices and the internet via a shared data link supplied by a data exchanger;
    monitoring a second set of device states comprises monitoring rate at which data is transferred over the shared data link; and
    utilizing at least two of the plurality of device indicator lights in concert comprises utilizing at least two of the plurality of device indicator lights in concert to communicate the rate.

4. The method of claim 1, wherein:
    providing a device comprises providing a router device configured to route data communications between a plurality of client devices and the internet via a shared data link supplied by a data exchanger, the router device being capable of wireless communication with the plurality of client devices;
    monitoring a second set of device states comprises monitoring a number of the plurality of client devices in wireless communication with the router device; and
    utilizing at least two of the plurality of device indicator lights in concert comprises utilizing at least two of the plurality of device indicator lights in concert to communicate the number.

5. The method of claim 1, wherein:
    providing a device comprises providing a device having a battery power source;
    monitoring a second set of device states comprises monitoring a power level of the battery power source; and
    utilizing at least two of the plurality of device indicator lights in concert comprises utilizing at least two of the plurality of device indicator lights in concert to communicate the power level.

6. The method of claim 1, wherein:
    providing a device comprises providing a device that includes a plurality of device indicator lights and a plurality of user controls;
    determining comprises determining whether one of the plurality of user controls has been activated; and
    utilizing at least two of the plurality of device indicator lights in concert comprises utilizing at least two of the plurality of device indicator lights in concert to communicate a particular one of the second set of device states, the particular one of the second set of device states corresponding to the particular one of the user controls determined to have been activated.

7. The method of claim 6, wherein:
determining comprises determining whether two or more of the plurality of user controls have been activated together; and
utilizing at least two of the plurality of device indicator lights in concert comprises utilizing at least two of the plurality of device indicator lights in concert to communicate a particular one of the second set of device states, the particular one of the second set of device states corresponding to the two or more user controls determined to have been activated together.

8. The method of claim 6, wherein determining comprises determining whether a first or a second one of the plurality of user controls has been activated, and wherein utilizing the plurality of device indicator lights in concert comprises:
upon determining that the first one of the user controls has been activated, utilizing a first set of the plurality of device indicator lights in concert to communicate a first one of the second set of device states, the first one of the second set of device states corresponding to the first one of the user controls; and
upon determining that the second one of the user controls has been activated, utilizing a second set of the plurality of device indicator lights in concert to communicate a second one of the second set of device states, the second one of the second set of device states corresponding to the second one of the user controls.

9. A system, comprising:
a plurality of device indicator lights and a user control;
a state engine configured to monitor a first set and a second set of device states, wherein the first set of device states correspond to binary device states, and the second set of device states correspond to analog device states;
a light engine configured to utilize each of the plurality of device indicator lights individually to communicate a current binary status of each of the first set of device states;
a control engine configured to determine whether the user control has been activated;
wherein the light engine is further configured to utilize at least two of the plurality of device indicator lights in concert to communicate a current magnitude of one of the second set of device states upon a determination by the control engine that the user control has been activated; and
wherein at least one of the plurality of device indicator lights is used to communicate both the current binary status of one of the first set of device states and the current magnitude of one of the second set of device states.

10. The system of claim 9, further comprising a router configured to route data communications between a plurality of client devices and the internet via a shared wireless data link supplied by a data exchanger, and wherein:
the second set of device states includes a strength of the wireless data link; and
the light engine is configured to utilize at least two of the plurality of device indicator lights in concert to communicate the strength.

11. The system of claim 9, further comprising a router configured to route data communications between a plurality of client devices and the internet via a shared data link supplied by a data exchanger, and wherein:
the second set of device states includes a rate at which data is transferred over the shared data link; and
the light engine is configured to utilize at least two of the plurality of device indicator lights in concert to communicate the rate.

12. The system of claim 9, further comprising a router configured to route data communications between a plurality of client devices and the internet via a shared data link supplied by a data exchanger, the router being capable of wireless communication with the plurality of client devices, and wherein:
the second set of device states includes a number of the plurality of client devices in wireless communication with the router; and
the light engine is configured to utilize at least two of the plurality of device indicator lights in concert to communicate the number.

13. The system of claim 9, further comprising a battery power source;
the second set of device states includes a power level of the battery power source; and
the light engine is operable to utilize at least two of the plurality of device indicator lights in concert to communicate the power level.

14. The system of claim 9, wherein:
the user control is one of a plurality of user controls;
the control engine is configured to determine whether one of the plurality of user controls has been activated; and
the light engine is configured to utilize at least two of the plurality of device indicator lights in concert to communicate a particular one of the second set of device states, the particular one of the second set of device states corresponding to the particular one of the user controls determined to have been activated by the control engine.

15. The system of claim 14, wherein:
the control engine is configured to determine whether two or more of the plurality of user controls have been activated together; and
the light engine is configured to utilize at least two of the plurality of device indicator lights in concert to communicate a particular one of the second set of device states, the particular one of the second set of device states corresponding to the two or more user controls determined to have been activated together by the control engine.

16. The system of claim 14, wherein the control engine is configured to determine whether a first one and a second one of the plurality of user controls has been activated, and the light engine is configured to:
upon a determination by the control engine that the first one of the user controls has been activated, utilize a first set of the plurality of device indicator lights in concert to communicate a first one of the second set of device states, the first one of the second set of device states corresponding to the first one of the user controls; and
upon a determination by the control engine that the second one of the user controls has been activated, utilize a second set of the plurality of device indicator lights in concert to communicate a second one of the second set of device states, the second one of the second set of device states corresponding to the second one of the user controls.

17. A computer readable medium having computer executable instructions, the instructions being executable by a device having a plurality of device indicator lights and a user control, wherein the medium includes instructions for:
monitoring a first set and a second set of device states, wherein the first set of device states correspond to binary device states, and the second set of device states correspond to analog device states;

utilizing each of the plurality of device indicator lights individually to communicate a current binary status of each of the first set of device states;

determining whether the user control has been activated;

utilizing at least two of the plurality of device indicator lights in concert to communicate a current magnitude of one of the second set of device states upon a determination that the user control has been activated; and wherein at least one of the plurality of device indicator lights is used to communicate both the current binary status of one of the first set of device states and the current magnitude of one of the second set of device states.

18. The medium of claim 17, wherein:

the device is a router device configured to route data communications between a plurality of client devices and the internet via a shared wireless data link supplied by a data exchanger;

the instructions for monitoring a second set of device states include instructions for monitoring a strength of the wireless data link; and the instructions for utilizing at least two of the plurality of device indicator lights in concert include instructions for utilizing at least two of the plurality of device indicator lights in concert to communicate the strength.

19. The medium of claim 17, wherein:

the device is a router device configured to route data communications between a plurality of client devices and the internet via a shared data link supplied by a data exchanger;

the instructions for monitoring a second set of device states include instructions for monitoring rate at which data is transferred over the shared data link; and the instructions for utilizing at least two of the plurality of device indicator lights in concert include instructions for utilizing at least two of the the plurality of device indicator lights in concert to communicate the rate.

20. The medium of claim 17, wherein:

the device is a router device configured to route data communications between a plurality of client devices and the internet via a shared data link supplied by a data exchanger, the router device being capable of wireless communication with the plurality of client devices;

the instructions for monitoring a second set of device states include instructions for monitoring a number of the plurality of client devices in wireless communication with the router device; and the instructions for utilizing at least two of the plurality of device indicator lights in concert include instructions for utilizing at least two of the plurality of device indicator lights in concert to communicate the number.

* * * * *